United States Patent [19]

Eng et al.

[11] Patent Number: 5,751,708
[45] Date of Patent: May 12, 1998

[54] ACCESS METHOD FOR BROADBAND AND NARROWBAND NETWORKS

[75] Inventors: Kai Yin Eng, Middletown; Mark John Karol, Fair Haven, both of N.J.

[73] Assignee: Lucent Technologies Inc., Murray Hill, N.J.

[21] Appl. No.: 547,822

[22] Filed: Oct. 25, 1995

[51] Int. Cl.⁶ .................................................. H04J 3/24
[52] U.S. Cl. .......................... 370/389; 370/394; 370/395; 370/348
[58] Field of Search .......................... 370/389, 347, 370/348, 395, 442, 443, 379, 394

[56] References Cited

U.S. PATENT DOCUMENTS

| | | | |
|---|---|---|---|
| 5,214,649 | 5/1993 | Van As et al. | 370/443 |
| 5,276,703 | 1/1994 | Budin et al. | 370/347 |
| 5,377,192 | 12/1994 | Goodings et al. | 370/348 |
| 5,400,362 | 3/1995 | Chennakephu et al. | 370/442 |
| 5,533,009 | 7/1996 | Chen | 370/395 |

*Primary Examiner*—Douglas W. Olms
*Assistant Examiner*—Shick Hom

[57] ABSTRACT

An access method allows an end-user device (mobile or stationary) a) to place stand-alone requests for access to a communications network for transmission thereto of one or more information packets arriving at an empty buffer of the end user-device, and b) to piggyback the requests with packet transmissions for subsequent information packets arriving at a non-empty buffer of the end-user device.

43 Claims, 6 Drawing Sheets

| LOGICAL ADDRESS | BUFFER STATE | NUMBER OF OUTSTANDING PACKETS | QUALITY OF SERVICE PARAMETERS |
|---|---|---|---|
| 0000 ..... 0000 | 0 | 0 | 0 |
| 0001 ..... 0000 | 1 | 3 | 2 |
|  | 1 | 4 | 1 |
| ⋮ | 0 | 0 | 0 |
|  | ⋮ | ⋮ | ⋮ |
| 1111 ..... 1111 | 1 | 6 | 3 |

ACCESS METHOD FOR BROADBAND AND NARROWBAND NETWORKS

TECHNICAL FIELD

This invention relates to communications systems and more particularly to a method and a system for end-user devices to contend for access to a shared communications resource of a broadband and/or narrowband network.

BACKGROUND OF THE INVENTION

Over the last three or more decades multiple access methods have been proposed to allow contending end-user devices to access a shared networking resource in an orderly fashion. Some of these access methods, such as Carrier Sense Multiple Access/Collision Detection (CSMA/CD) and token-passing have enjoyed, and continue to enjoy tremendous commercial success in the marketplace. These access methods were generally designed to satisfy requirements associated with a single medium (typically data), and to operate in environments with well-defined characteristics, such as Local and Wide Area Networks for asynchronous networks, or local and remote polling for synchronous networks. With the advent of wireless and wired broadband networks capable of supporting an integrated mix of heterogeneous multimedia traffic, the access methods that were designed for interactive wired data communications, became ill-suited to satisfy requirements of other media or traffic types, such as voice, and video. Specifically, those access methods are unable to assign priority for end-user devices to access a shared communications resource based on the Quality-of-Service (QoS) parameters associated with a particular traffic type (or application) from the end-user devices. For example, the high-bandwidth, low-delay inherent characteristics of real-time video applications require an access method that gives a processor or scheduler wide latitude in assigning access priority to serve end-user devices generating video data streams before serving other end-user devices associated with applications with less stringent delay requirements.

In response to this problem, some network designers have proposed enhanced access methods designed specifically for broadband networking environments. Unfortunately, the solutions proposed by those enhanced access methods are either operative only in specific environments, such as short propagation delay environments, or are operative at a bandwidth overhead cost that renders their use impractical in wireless networking environments where bandwidth is at a premium due to limited frequency spectrum availability. Thus, a problem of typical access methods is lack of both a) assignment of priority to end-user devices contending for access to the shared communications resource based on Quality-of-Service (QoS) parameters associated with applications from those end-user devices, and b) efficiency in the use of the bandwidth of the shared communications resource. Another problem of the prior art is lack of an access method that can be used for a wide range of applications over short and long distances, and for a large class of traffic types.

SUMMARY OF THE INVENTION

The present invention is directed to an access method that allows an end-user device (mobile or stationary) a) to place stand-alone requests for access to a shared communications resource for transmission thereto of one or more information packets arriving at an empty buffer of the end user-device, and b) to piggyback the requests with packet transmissions for subsequent information packets arriving at a non-empty buffer of the end-user device. As used therein, the term "standalone requests" refers to requests that are transmitted by themselves i.e., that are not included in information packets, as is the case for piggybacked requests. Stand-alone and piggybacked requests may be transmitted, for example, as data symbols represented by a single bit or a string of bits.

In accordance with the principles of the invention, a stand-alone request from one end-user device competes for access to the shared communications resource with other comparable stand-alone requests from other end-user devices that are also coupled to the shared communications resource. This competition for access is hereinafter referred to as "contention". Because of this contention, overlapping transmissions of stand-alone requests from two or more contending end-user devices may result in a collision.

In an embodiment of the principles of the invention, a scheduler receives information packets and data symbols by listening to transmission channels of the shared communications resource that is coupled to the end-user devices. The scheduler is also designed to grant permission to end-user devices to access the shared communications resource based on access priority codes, such as the Quality-of-Service (QoS) parameters called for by the application associated with each active end-user device. Specifically, the scheduler announces during a transmission period, such as a time slot, the identification number of the end-user device selected to transmit its information packet during a later transmission period. Because of this scheduling process for packet transmission (e.g., one end-user device is allowed to transmit its information packet(s) at a time), the piggybacked requests are transmitted in a collision-free manner. This allows the end-user devices to avoid contention for access requests associated with information packets arriving at non-empty buffers of the end-user devices.

Advantageously, the access method of the invention allows end-user devices to share the limited bandwidth of a common communications resource in an efficient manner by maximizing the utilization of the frequency spectrum and minimizing the number of collisions and, hence, the amount of delay experienced by the end-user devices. In addition, the explicit announcement of the transmission permissions gives the scheduler complete control over the order in which end-user devices transmit their information packets. This important feature helps the scheduler to satisfy diverse Quality-of-Service (QoS) requirements in multimedia networks, such as ATM networks.

DETAILED DESCRIPTION

Figure 1A:
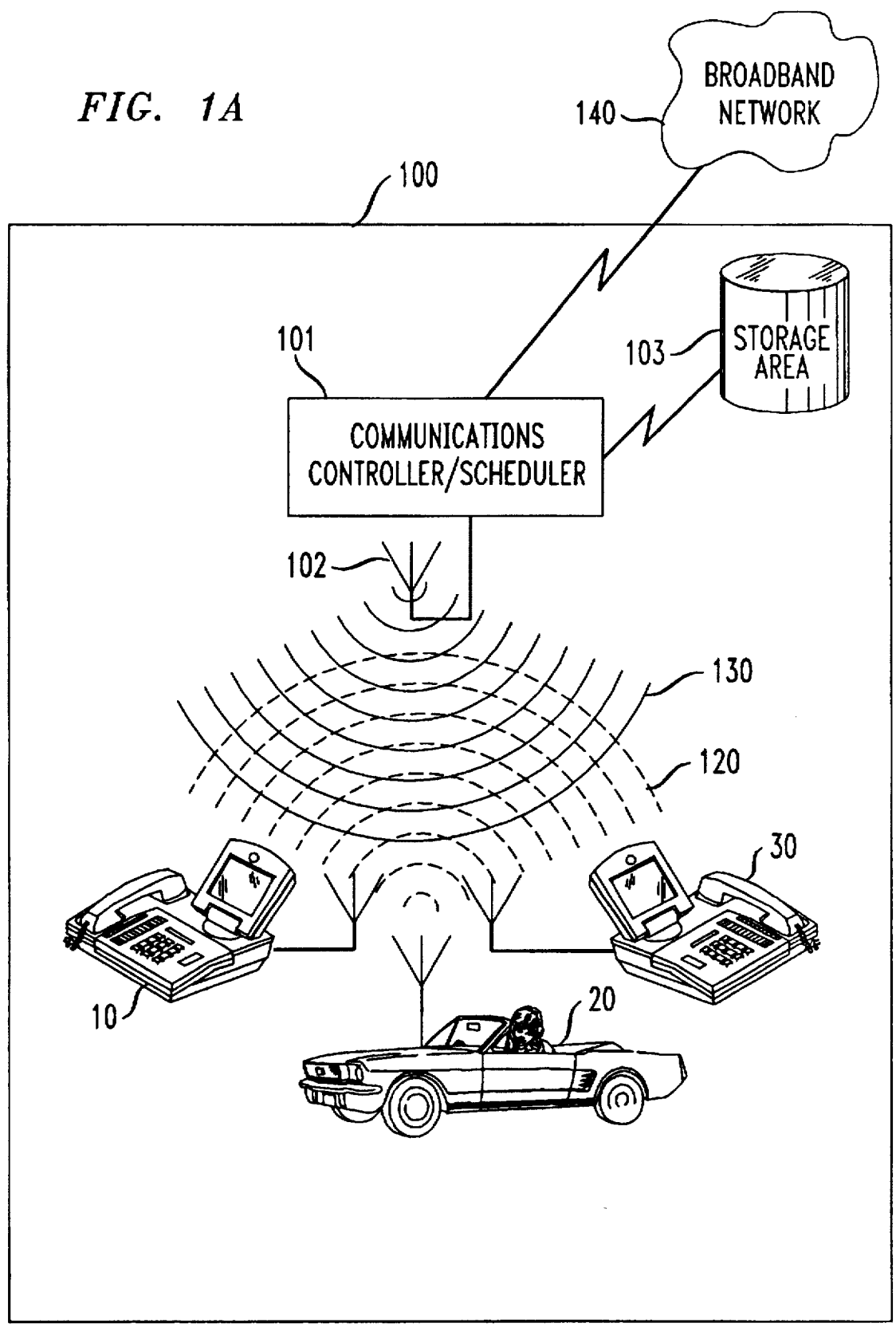
FIGS. 1A and 1B show a wireless and a wired communications networks, respectively, that are arranged in accordance with the invention to allow end-user devices to transmit thereto certain transmission requests in a collision-free manner.
Figure 1B:
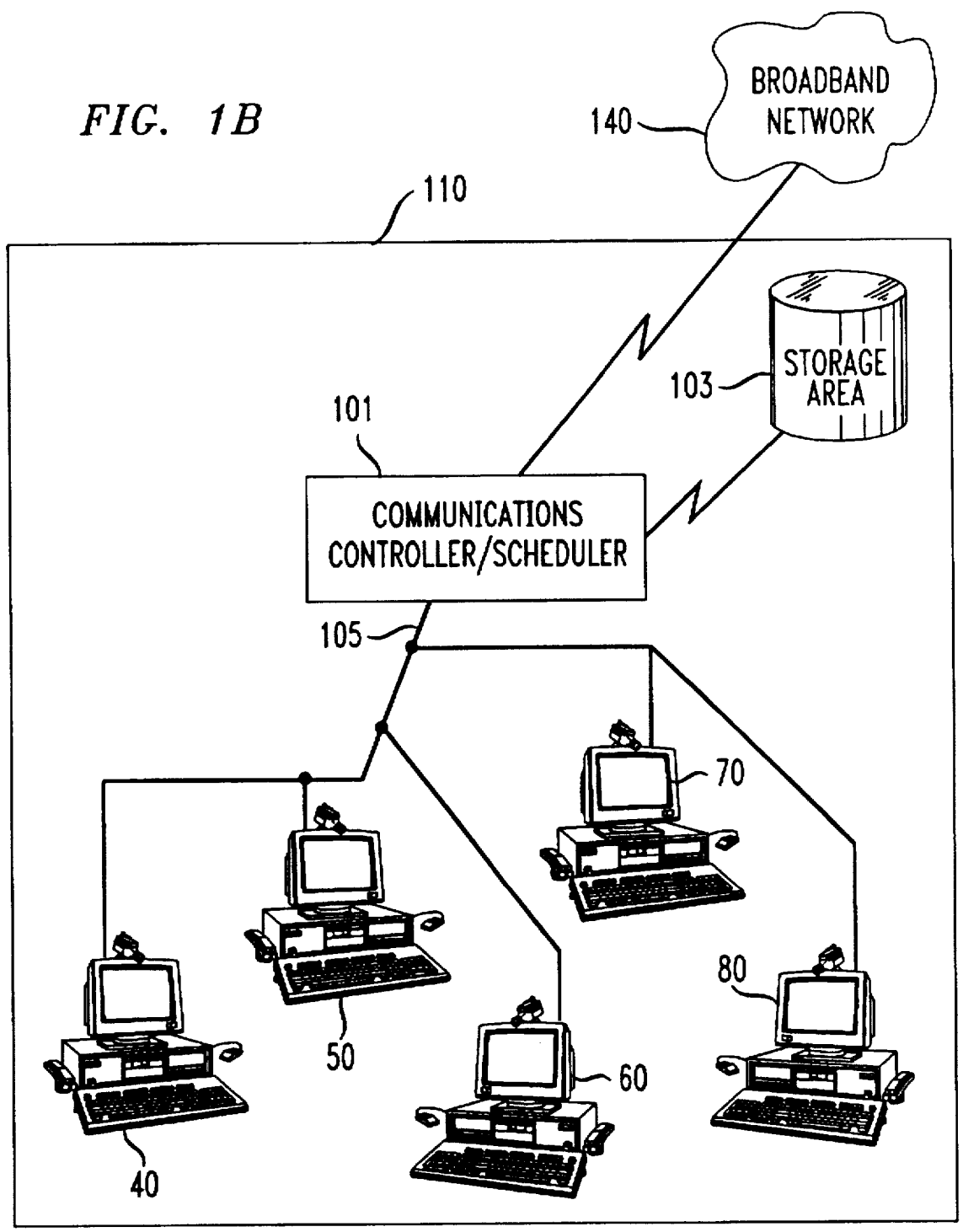

Shown in FIGS. 1A and 1B are communications networks 100 and 110 that are arranged to switch locally or to relay to broadband network 140 an integrated mix of multimedia traffic received from end-user devices 10–80. Broadband network 140 may be a wired or wireless multimedia communications network that is designed to switch to their intended destination the integrated mix of multimedia traffic received from communications networks 100 and 110. The integrated mix of multimedia traffic may have a wide variety of characteristics that are application-dependent. Those characteristics include high- and low-bandwidth traffic, real-time versus retransmission-tolerant applications, bursty or continuous data streams, connectionless or connection-oriented protocols. Communications network 100 may be a wireless network, such as a Wireless Local Area Network (WLAN), a Personal Communications Network (PCS) or a cellular network that supports, for example, the well-known Asynchronous Transfer Mode (ATM) protocol for transmission of fixed-length packets to and from end-user devices 10–30. Similarly, communications network 110 may be a cable distribution system network or a wired LAN that is arranged to transport multimedia traffic according to a selected protocol, such as the Asynchronous Transfer Mode (ATM) protocol.

Figure 5:
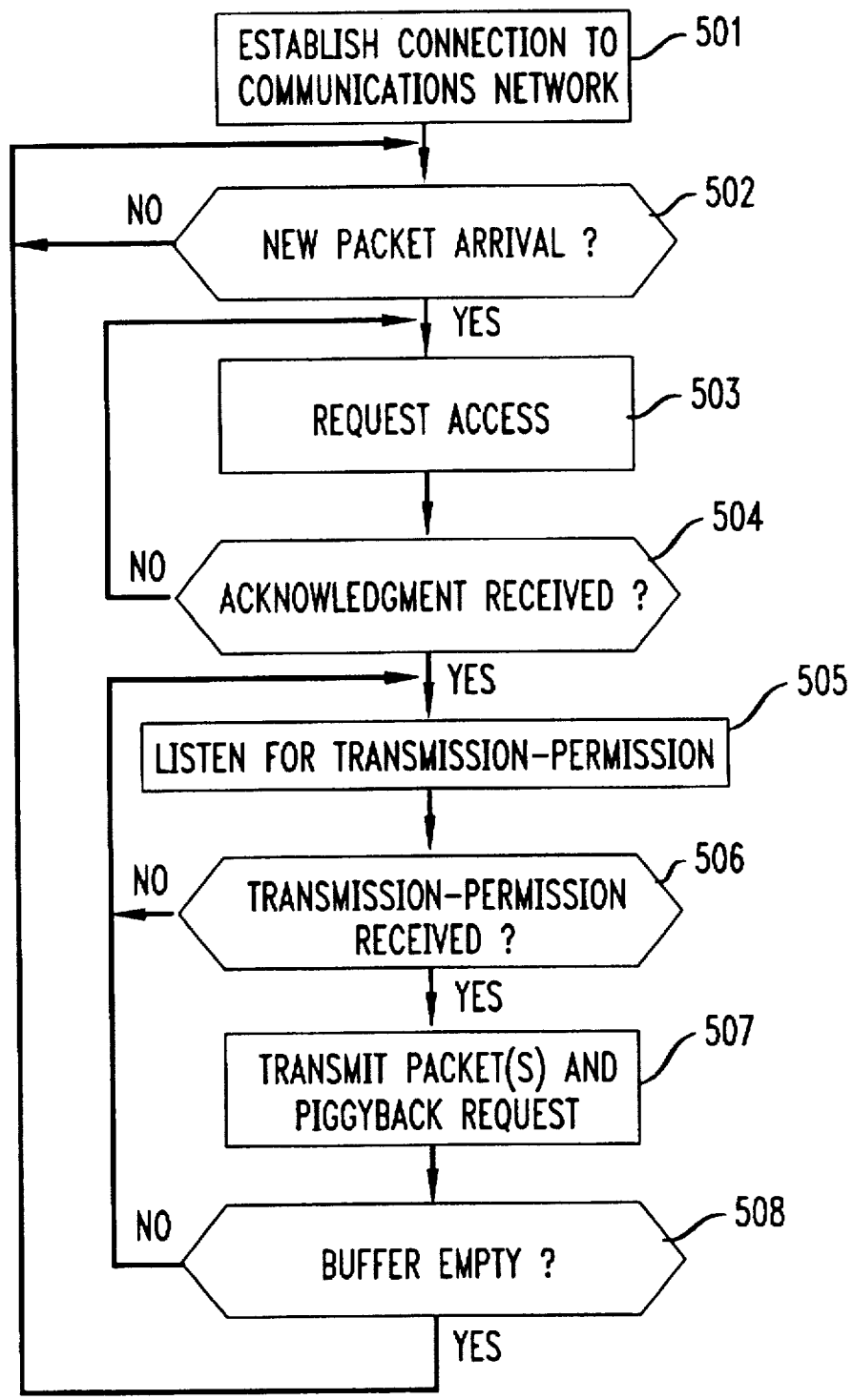
FIG. 5 presents in flow diagram format instructions executed by different components of the network of FIG. 1 to implement the principles of the invention.

End-user devices 10–80 may be multimedia or single-medium wireless (10–30) or wired (40–80) communications devices that include one or more microprocessors arranged to execute the instructions shown in FIG. 5.

At the heart of communications networks 100 and 110 is communications controller/scheduler 101 that is arranged to receive from end-user devices 10–80 signaling messages to request access to communications paths that is shown in FIG. 1A as uplink radio channel 120, and that is represented in FIG. 1B as physical wired facility 105. Communications controller/scheduler 101 honors those requests by granting permission to the end-user devices to transmit their buffered information packets via the uplink radio channel 120 or wired physical facility 105. When communications network 100 is a multimedia cellular or PCS network, communications controller/scheduler 101 may be a base station that includes a transceiver that is coupled to a processor or a communications switch (not shown). Alternatively, communications controller/scheduler 101 may be a wireless network hub unit connected to a server when communications network 100 is a wireless LAN. The base station or network hub unit uses antenna 102 and downlink wireless channel 130 to deliver signaling and payload information to end-user devices 10–30. Similarly, uplink channel 120 and antenna 102 provide a communications path for end-user devices 10–30 to forward signaling and payload information to communications controller/scheduler 101.

With reference to FIG. 1 B, when communications network 110 is a cable distribution network, communications controller/scheduler 101 may be a head-end that includes a series of bi-directional (i.e., forward and reverse direction) amplifiers that are coupled to a processor. Alternatively, communications controller/scheduler 101 may be a network hub unit that is coupled to a server when communications network 110 is a wired LAN or a WAN. Because end-user devices 40–80 communicate with communications controller/scheduler 101 via a common physical facility 105, the uplink and downlink channels in the physical facility 105 are logical channels that are multiplexed using for example, well-known time-division or frequency-division multiplexing techniques.

In an illustrative embodiment of the principles of the invention, communications controller/scheduler 101 receives payload information (Xmt) and signaling information such as, Transmit-Request (Xmt_Req) signals from end-user devices 10–30 (40–80) by listening to the uplink channel 120 (logical uplink channel of wired facility 105) that is coupled to end-user devices 10–30 (40–80). The Transmit-Request (Xmt_Req) signals are sent by the end-user devices 10–30 (40–80) to communications controller/scheduler 101 when these end-user devices have one or more buffered payload information packets to transmit thereto. Similarly, communications controller/scheduler 101 forwards to end-user-devices 10–80 acknowledgment (ACK) signaling messages to confirm reception of Transmit-Request (Xmt_Req) signaling information. Other signaling information forwarded by communications controller/scheduler 101 to end-user-devices 10–80 include Transmit-Permission (Xmt_Perm) signals which indicate that communications controller/scheduler 101 grants permission to a particular end-user device to transmit its packet during the next transmission cycle or time slot. These ACK and Xmt_Perm messages are received by end-user devices 10–80 by listening, for example, to the downlink channel 130 or the logical downlink signaling channels of wired facility 105.

While the uplink (end-user device-to-base station) channel 120 and downlink (base station-to- end-user device) channel 130 may be radio channels operating at separate frequencies, it is to be understood that the uplink and downlink channels 120 and 130, respectively, can also be logical channels that are multiplexed on a single-frequency physical radio channel using for example, time-division multiplexing techniques.

When communications controller/scheduler 101 receives a request-for-connection signal from one of the end-user devices 10–80 at call setup phase, for example, communications controller/scheduler 101 assigns to that end-user device a logical address that identifies the end-user device for the duration of the connection. The logical address is hereinafter called an "Access Identification Number" or Access ID for short. When the ATM protocol is used, the request-for-connection signal includes traffic parameter specification such as a Quality-of-Service (QoS) parameter or class which identifies variables such as, cell transfer delay, delay jitter, cell loss ratio, source type (e.g., telephone/single-medium application vs. videophone/multimedia application), to name a few.

Figures 2, 4:
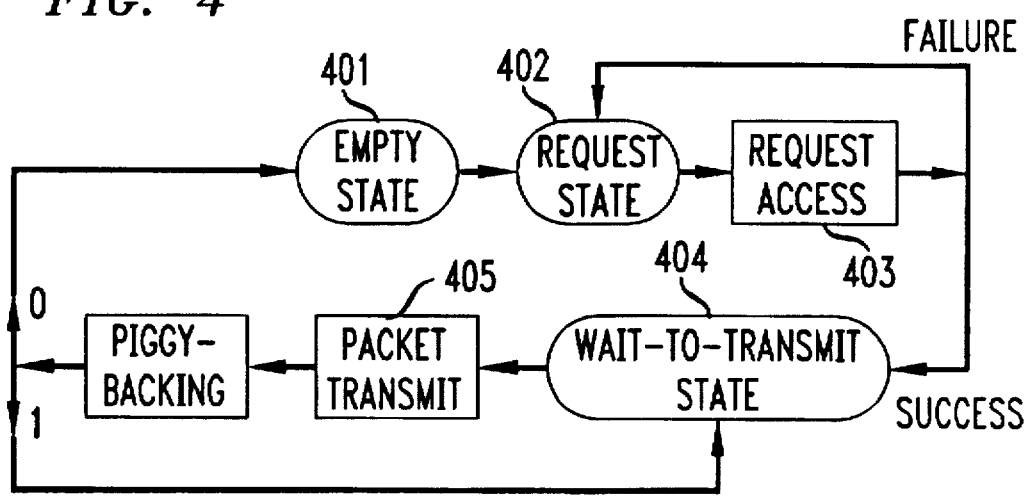
FIG. 2 illustrates a table that stores identification and transmission request information for active end-user devices on the communications network of FIGS. 1A and 1B.
FIG. 4 illustrates different states of an end-user device contending for access to the shared communications resource.

As communications controller/scheduler 101 receives transmission requests from end-user devices 10–30, or 40–80, communications controller/scheduler 101 updates the appropriate entries in a Request Table that is illustrated in FIG. 2. The Request Table of FIG. 2 contains an entry for all end-user devices that are active on communications network 100 or 110. Each entry in the Table of FIG. 2 contains an end-user device's Access ID and associated fields which include the state of the buffer of the end-user device and the quality of service parameters received as part of the request for connection signal. As mentioned above, the quality of service parameters include many variables that are represented by single digits in the Request Table of FIG. 2 for the sake of simplicity. For example, a QoS value of "0" is assigned for delay-tolerant, single-medium (or traffic type) application associated with an end-user device, while a QoS value of "3", for the purposes of this illustration, is assigned to a very high-bandwidth multimedia application from an end-user device. Values ranging from "1" to "2" are similarly assigned to applications based on their degree of delay-tolerance and other traffic characteristics. Communications controller/scheduler 101 assigns priority for access to uplink channel 120 or wired facility 105 based on the QoS parameters associated with an end-user device that has outstanding packet(s) to transmit as indicated by the number of outstanding packets field. The buffer state field indicates whether an end-user device has any outstanding packet to transmit.

Figure 3:
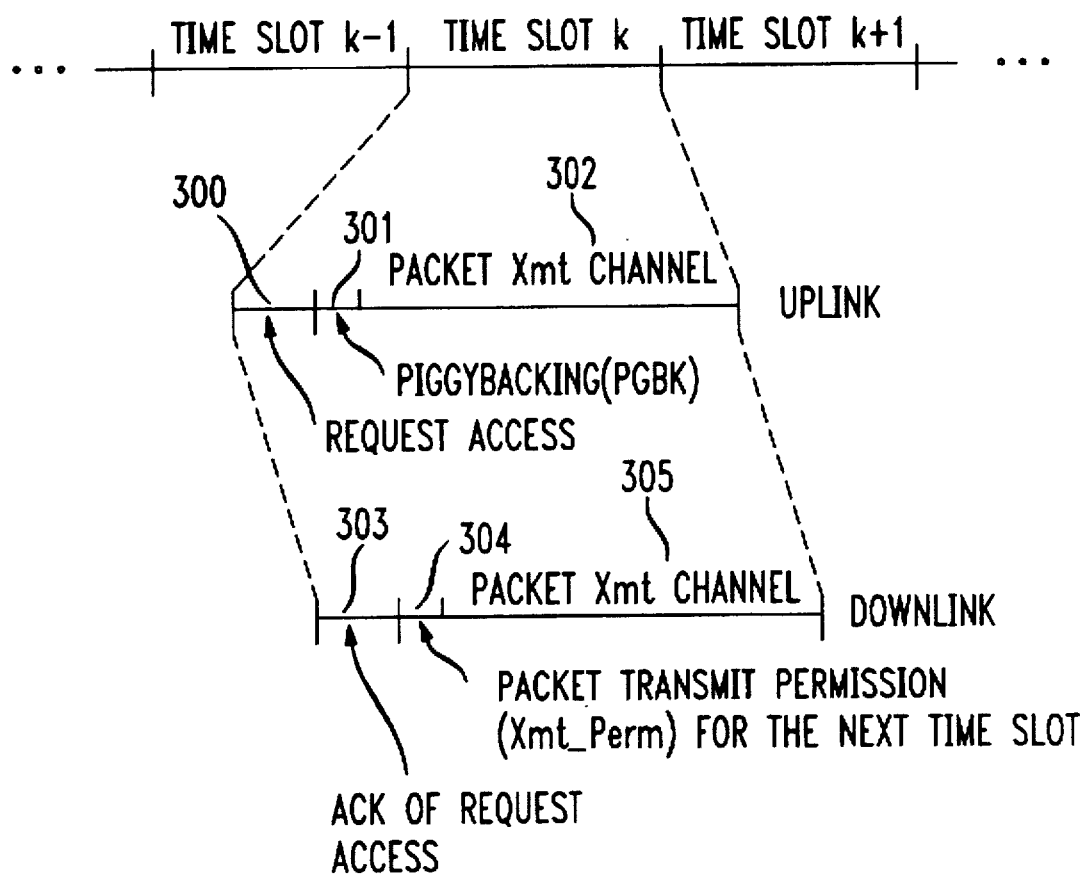
FIG. 3 illustrates a time slot allocation mechanism for the bandwidth of the shared communications resource.

FIG. 3 illustrates a time slot allocation mechanism for the bandwidth of the uplink channel 120, the downlink 130 and the logical uplink and downlink channels of wired facility 105. According to one aspect of the invention, the bandwidth of the uplink channel 120, or the bandwidth of the uplink logical channel of wired facility 105 can be allocated according to a time-slotted system in which a Request-Access (RA) Channel 300 and a Packet-Transmission (Xmt) Channel 302 are formed on a slot-by-slot basis. The Piggybacking (PGBK) transmission channel 301 is included in the Xmt Channel 302. During time slot k, an end-user that has received transmission permission from communications controller/scheduler 101 (during a previous time slot) is allowed to transmit its information packet in the Transmit (Xmt) channel 302. The Request Access (RA) channel 300 may be used during time slot k by any end-user device to transmit a Transmit_Request (Xmt_Req) signal to indicate to communications controller/scheduler 101 that the end-user device has at least one buffered information packet to transmit thereto. To implement an orderly access to RA channel 300, random access protocols, such as the well-known ALOHA or the Binary Stack Algorithm may be used with minor modifications for the RA Channel 300 to handle issues such as collision resolution, access priority and back-off procedures. As appropriate, larger or smaller numbers of RA Channels can be allocated than indicated in FIG. 3 as discussed below in connection with FIGS. 6A and 6B.

The time-slotted system is also used to allocate the bandwidth of the downlink channel 130, or the bandwidth of the downlink logical channel of wired facility 105 so as to form an Acknowledgment (ACK) channel 303, a Transmit-Permission (Xmt_Perm) channel 304 and a Packet Transmit (Xmt) channel 305. Hence, within the period defined by a time slot, communications controller scheduler 101 may a) broadcast an ACK signaling message to an end-user device using the ACK channel 303. b) grant permission for transmission of an information packet to the same or a different end-user device using the Xmt_Perm channel 304, and c) forward an information packet to the same or a different end-user device via (Xmt) channel 305.

Of particular significance is the transmit permission (Xmt_Perm) signaling information that is carried over the Xmt_Perm channel 304. The Xmt_Perm signaling information allows communications controller/scheduler 101 to serve end-user devices (with buffered information packets) according to a desired packet transmission policy. In other words, communications controller/scheduler 101 allocates the bandwidth of uplink Xmit channel 302 according to the desired packet transmission policy. This policy serves to determine which end-user device with outstanding buffered packets to transmit, gets permission to transmit a packet during the next time slot. The policy takes into consideration the QoS parameters associated with end-user devices with different traffic characteristics or different service requirements. For example, the Guaranteed-Bandwidth Delivery service policy that is described in the U.S. Pat. application identified by Ser. No. 08/408758, offers guaranteed bandwidth for sources while efficiently sharing resources in order to minimize overall system delay.

FIG. 4 illustrates different states of an end-user device contending for access to the Xmt channel 302. Each active end-user device may be in one of four states, namely the Empty State 401, the Request State 402, the Wait-to-Transmit State 404 or the Packet-Transmit State 405. End-user devices with empty buffers are said to be in the Empty State 401. When one or more information data streams arrive at the buffer of an end-user device in the Empty State 401, the end-user device enters the Request State 402. An end-user device in the Request State 402 sends its Xmit_Req signaling information 403 via the RA channel 300. Thereafter, the end-user device starts a timer, and stays in the Request State 402 until the communications controller/scheduler 101 acknowledges reception of the Xmt_Req signaling information by broadcasting its Access ID over the ACK channel 303 When no ACK message is received from communications controller/scheduler 101 after the expiration of the timer, the Xmit_Req signaling information is considered lost and is thereafter retransmitted when the end-user device can access the RA channel 300. When one of the end-user devices 10–80 in Request State 402 receives an acknowledgment (ACK) signaling message from communications controller/scheduler 101, the end-user device switches to the Wait-to-Transmit State 404. An end-user device in the Wait-to-Transmit State 404 listens to the Xmt_Perm channel 304 until it hears its Access ID coupled with a Xmt_Perm signal. Thereafter, the end-user device whose Access ID was called, shifts to the Packet-Transmit state 405 to transmit a packet during the next time slot. If the buffer state of the end-user device still has a value of "1"(that is indicative of a non-empty buffer) the end-user device includes in the packet being transmitted a contention-free Xmt_Req message using the Piggybacking (PGBK) Request Data Symbol, as described below.

The process contemplated by the invention is initiated in step 501 when an end-user device, such as end-user device 10 (40) for example, establishes a connection to communications network 100 (110). When end-user device 10 (40) receives a new packet to be transmitted to communications network 100 (110), as determined in step 502, a Xmt_Req signaling message is transmitted to communications controller/scheduler 101 via the RA channel 300.

Once the end-user device 10 (40) receives, as determined in step 504, an ACK signaling message from communications controller/scheduler 101(via downlink ACK Channel 303), the end-user device 10 (40), in step 505, listens to the downlink Transmit-Permission (Xmt_Perm) Channel 304 every time slot until it hears its Access ID, as determined in step 506. As discussed earlier, communications controller/scheduler 101 broadcasts a transmission permission signaling message along with an Access ID to grant permission to an end-user device (associated with the Access ID) to transmit a packet at a later time slot. This allows the scheduler to account for long propagation delays over the transmission channels or to implement frame-by-frame scheduling over multiple time slots. Each time end-user device 10 (40) transmits a packet (using the uplink Xmt Channel 302), it also includes a Piggybacking (PGBK) Request Data Symbol therein, as shown in step 507, to indicate whether it has more packets in its buffer. This piggybacking serves as a contention-free Xmt_Req signal when end-user device 10 (40) transmits a packet. End-user device 10 (40) continues to listen for transmission permission until its buffer becomes empty, and every time it receives such permission, it transmits its buffered packets, as outlined in steps 505 to 508. Thereafter, steps 502 to 508 are repeated until the communication between end-user device 10 (40) and communications network 100 (110) is terminated. It is worth noting that once end-user device 10 (40) successfully sends a Xmt_Req signal over the RA channel 300, the Xmt_Req signaling messages for additional packets arriving at the end-user device non-empty buffer are sent to communication controller/scheduler 101 by piggybacking those requests in a contention-free fashion. In other words only packets arriving to an empty buffer of end-user device 10 (40) will send a Xmt_Req over the RA Channel 300. This technique operates to dramatically reduce contention for the use of the RA Channel 300 during each time slot. Advantageously, the reduction of contention for the use of RA Channel 300 greatly reduces delay in accessing communications network 100 (110) by end-user devices 10–30 (40–80).

Upon receiving a PGBK Request Data Symbol, communications controller/scheduler 101 updates the appropriate entry in the Request Table of FIG. 2 for the transmitting end-user device, as described above. Specifically, when the PGBK Request Data Symbol is implemented as a bit, a value of "1" in the PGBK Request Bit indicates to communications controller/scheduler 101 that end-user device 10 (40) has additional packets to transmit, while a value of "0" notifies the communications controller/scheduler 101 that the buffer of end-user device 10 (40) is empty. Alternatively, the PGBK Request Data Symbol may be implemented as a multi-bit data stream that is indicative of the number of outstanding packets in the buffer of end-user devices 10 (40). Information about the number of outstanding packets in the buffer of end-user devices 10 (40) that are waiting to be transmitted is desirable in implementations, such as where (i) there are multiple Packet Xmt Channels per time slot (e.g., on multiple frequencies); (ii) the desired packet transmission policy (implemented at communications controller/scheduler 101) depends on the actual number of outstanding packets in the buffer of each end-user device 10–30 (40–80); or (iii) the round-trip propagation delay between communications controller/scheduler 101 and end-user devices 10–30 (40–80) is large.

Figure 6A:
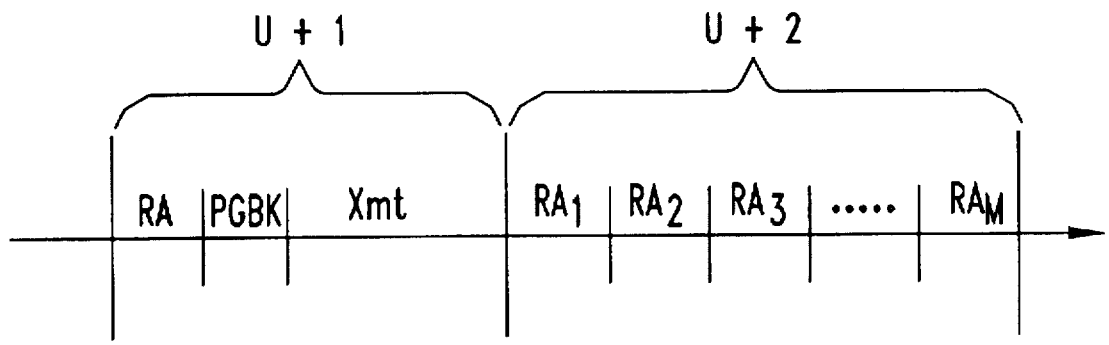
FIGS. 6A and 6B illustrate a time slot allocation mechanism based on the level of congestion in the network.
Figure 6B:
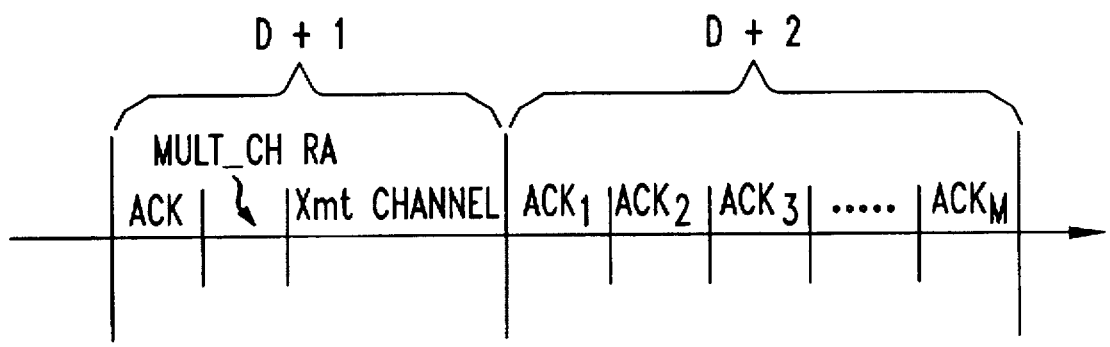

FIGS. 6A and 6B illustrate a time slot allocation mechanism that takes advantage of idle time slots on the packet-transmission channels 302 and 305. Shown in FIG. 6A are time slots U+1 and U+2 for the uplink channel 120 in FIG. 1A or the uplink logical channel of wired facility 105 in FIG. 1B. During the time slot U+2 only Request Access (RA) channels are formed. Likewise, FIG. 6B shows time slots D+1 and D+2 for the downlink channel 130 of FIG. 1A and the downlink logical channel of wired facility 105 of FIG. 1B. During the time slot D+2, only Acknowledgment (ACK) channels are formed.

RA channels are formed exclusively on time slot U+2 channel when communications controller/scheduler 101 realizes during time slot U+1 that all the end-user devices 10–30 (40–80) are either in the Empty State 401 or the Request State 402. If this happens in the mode of operation illustrated in FIG. 3, the time slot U+2 would be idle since communications controller/scheduler 101 would not know which, if any, of the end-user devices have packets to transmit. To avoid wasting the valuable transmission time represented by the bandwidth that would be allocated to Xmt Channel 302 in the mode of operation illustrated in FIG. 3, the (otherwise) idle uplink Xmt Channel 302 is advantageously converted into multiple RA Channels in time slot U+2, as shown in FIG. 6A. This conversion also serves to relieve contention on the RA Channel 300 (in the normal mode of operation) in the event there are many end-user devices backlogged in Request State 402. Communications controller/scheduler 101 publicizes to end-user devices 10–30 (40–80) the availability of the multiple RA channels by broadcasting (via Xmt_Perm Channel 304) a Multi—CH RA signaling message during time slot D+1. The Multi—CH RA signaling message in effect informs end-user devices 10–30 (40–80) that during the next time slot U+2, the uplink Xmt Channel will be converted into multiple RA Channels. Furthermore, in order to acknowledge reception of potentially multiple Xmt_Req signaling messages, communications controller/scheduler 101, in time slot D+2 converts the Xmt Channel 305 into multiple ACK Channels.

It is worth noting that even if some (as opposed to all) of the end-user devices 10–30 (40–80) are in Empty State 401 or Request State 402, it is still possible to dynamically convert an uplink (downlink) Xmt Channel 302 (305) to multiple RA (ACK) Channels whenever communications controller/scheduler 101 senses that there is a large backlog of end-user devices in Request State 401 (e.g., by observing the number of collisions on the RA Channel 300). This adaptive control of the bandwidth of RA channel 300 adds one additional time slot delay for uplink and downlink packet transmissions, but provides communications controller/scheduler 101 with a more accurate picture of which end-user devices are waiting to transmit packets. This information may help communications controller/scheduler 101 determine the order in which end-user devices should transmit their packets.

According to another aspect of the invention, when the uplink channel and downlink channel are time-division multiplexed on the same frequency channel (i.e., time-division duplex), communications controller/scheduler 101 can manage the bandwidth of the uplink and downlink channels based on traffic conditions. In other words, communications controller/scheduler 101 can, in response to traffic conditions, change the amount of bandwidth assigned to the uplink (for Requests and Packet Transmissions) and downlink channels (i.e., dynamic sharing of the bandwidth). This may be implemented, for example, by communications controller/scheduler 101 assigning an entry for itself in the Request Table of FIG. 2. Accordingly, communications controller/scheduler 101 can announce over the Xmt_Perm Channel 305 its own Access ID (which every end-user device recognizes) when it is going to transmit a "downlink" packet during the next time slot. In other words, in a time-division duplex implementation, the Access ID announced over the Xmt_Perm Channel 305 indicates whether the following time slot will be for uplink or for downlink communications. The packet transmission policy, which determines the next packet to be transmitted, will most likely need to serve the communications controller/scheduler 101 more often than the end-user devices (e.g., using a weighted round-robin policy), since the communications controller/scheduler 101 needs to transmit all the "downlink" traffic.

The foregoing is to be construed as only being an illustrative embodiment of this invention. Persons skilled in the art can easily conceive of alternative arrangements providing functionality similar to this embodiment without any deviation from the fundamental principles or the scope of this invention. For example, an end-user device with one packet in its buffer may elect to include a piggybacked request in that packet for transmission. This may be done, for example, when that end-user device expects to receive one or more additional packets before the scheduler grants permission for the end-user devices to transmit those additional packets.

We claim:

1. A method for an end-user device to request access to a communications network, said method comprising the steps of:

receiving at an empty buffer of said end-user device at least one information packet;

transmitting from said end-user device to a scheduler of said communication network a stand-alone data symbol to request permission to transmit said at least one information packet; and in response to said end-user device receiving permission from said scheduler to transmit said at least one information packet, including a piggybacked data symbol in said at least one information packet being transmitted, said piggybacked data symbol communicating to said scheduler a request to transmit one or more information packets remaining in said buffer of said end-user device.

2. The method of claim 1 further comprising the steps of:

a) in response to said end-user device receiving permission from said scheduler to transmit said one or more information packets remaining in said buffer, including said piggybacked data symbol in said one or more remaining information packets being transmitted in order to communicate to said scheduler a request to transmit additional one or more information packets remaining in said buffer;

b) repeating step a) for said additional one or more information packets until said buffer is empty.

3. The method of claim 1 wherein the scheduler grants permission to a plurality of said end-user devices contending to transmit their respective information packets to said communications network, based on access priority codes associated with said end-user devices.

4. The method of claim 3 wherein said access priority codes are quality-of-service parameters.

5. The method of claim 1 wherein said communications network includes a first communications path that provides a communication link from a plurality of said end-user devices to said scheduler and a second communications path that provides a transmission link from said scheduler to said end-user devices.

6. The method of claim 1 further comprising the steps of:

defining at said scheduler a) a first transmission period during which at least one of a plurality of said end-user devices transmits at least one information packet to said communications network, and b) a second transmission period during which said communications network transmits data to at least one of said end-user devices.

7. The method of claim 6 further comprising the step of:

extending said first transmission period at expense of said second transmission period when said scheduler determines that said end-user devices have more to transmit to said communications network than said communications network has to transmit to said end-user devices.

8. The method of claim 6 further comprising the step of:

extending said second transmission period at expense of said first transmission period when said scheduler determines that said communications network has more to transmit to said end-user devices than said end-user devices have to transmit to said communications network.

9. The method of claim 6 further comprising the step of: dividing said first transmission period into sub-periods such that a) during a first one of said sub-periods at least one information packet is transmitted from any one of said end user devices to said communications network, and b) during a second one of said sub-periods said stand-alone data symbol is transmitted from any one of the end-user devices to said communications network.

10. The method of claim 6 further comprising the step of:

dividing said second transmission period into a plurality of sub-periods such that said scheduler transmits to one or more of said end-user devices a) during at least a first one of said sub-periods at least one message acknowledging reception of said request to transmit originated from at least one of said end-user devices, b) during at least a second one of said sub-periods at least one signaling indicia that represents transmission permission is granted to at least one of the end-user devices, and c) during at least a third one of said sub-periods, said data.

11. The method of claim 6 further comprising the step of dividing said first transmission period into a plurality of sub-periods so as to form a) at least one first uplink logical channel for transmission of said stand-alone data symbol when said end-user device buffer is empty, said at least one first uplink logical channel being associated with at least one of said sub-periods and b) at least one second uplink logical channel for transmission of said at least one information packet, said at least one second uplink logical channel being associated with at least one one of said sub-periods.

12. The method of claim 11 wherein said first transmission period is allocated substantially in its entirety to a plurality of said first uplink logical channels.

13. The method of claim 11 wherein said first transmission period is allocated substantially in its entirety to a plurality of said second uplink logical channels.

14. The method of claim 6 further comprising the step of:

dividing said second transmission period in a plurality of sub-periods so as a) to form during at least one of said sub-periods at least one first downlink logical channel for transmission of at least one message acknowledging reception of said request to transmit originated from one of said end-user devices, b) to form during at least one of said sub-periods at least one second downlink logical channel for transmission of transmission permission granted to at least one of the end-user devices and c) to form during at least one of said sub-periods at least one third downlink logical channel for transmission of said data.

15. The method of claim 14 wherein said second transmission period is allocated substantially in its entirety to a plurality of said first downlink logical channels.

16. The method of claim 11 wherein said communications network is a shared physical communications path that connects said end-user devices to said scheduler wherein communications from said end-user devices to said scheduler take place at a first frequency associated with said communications path, and communications from said scheduler to said end-user devices take place at a second frequency associated with said communications path.

17. A method for a communications device to request access to a communications network to which a plurality of communications devices are connected, said method comprising the steps of:

including in a data packet that is being transmitted by one of said communications devices to a processor controlling access to said communications network, a piggybacked data signal indicative of a request to transmit to said communications network one or more additional data packets that are stored in a storage area of said one of said communications devices; and when one or more data packets arrive at an empty storage area of said one of said communications devices, transmitting from said one of said communications devices to said communications network a stand-alone data signal in contention with similar data signals from one or more other communications devices similarly situated, said stand-alone data signal being transmitted to indicate a request to access said communications network for transmission of at least one of said one or more data packets.

18. The method of claim 17 wherein said processor grants transmission permission to contending end-user devices to transmit said data packets to said communications network based on access priority codes associated with applications from said end-user devices.

19. The method of claim 18 wherein said access priority codes are quality-of-service parameters.

20. The method of claim 17 wherein said processor during a first transmission period sends to at least one of said communications devices a message granting permission to said at least one of said communications devices to transmit at least one of said data packets during a subsequent transmission period that follows said first transmission period.

21. A communications system comprising:
a plurality of end-user devices that are connected to a communications network wherein at least one of said end-user devices a) avoids contending for access to a communications network by including a piggybacked data symbol in at least one information packet being transmitted to said communications network by said at least one of said end-user devices in order to signal a request to transmit one or more additional information packets that previously arrived at a non-empty storage area of said at least one of said end-user devices, and b) contends for access to said communications network by transmitting a stand-alone data symbol in order to request access to said communications network for one or more information packets that newly arrive at an empty buffer of said at least one of said end-user devices; and a scheduler that receives said requests for access, and allocates access to said communications network based on priority codes associated with said end-user devices.

22. The system of claim 21 wherein said scheduler defines a) a first transmission period during which at least one of said end-user devices transmits at least one information packet to said communications network, and b) a second transmission period during which said communications network transmits data to at least one of said end-user devices.

23. The system of claim 22 wherein said scheduler extends said first transmission period at expense of said second transmission period when said scheduler determines that said end-user devices have more to transmit to said communications network than said communications network has to transmit to said end-user devices.

24. The system of claim 22 wherein said scheduler extends said second transmission period at expense of said first transmission period when said scheduler determines that said communications network has more to transmit to said end-user devices than said end-user devices have to transmit to said communications network.

25. The system of claim 22 wherein said scheduler divides said first transmission period into at least a first and a second sub-periods such that during said first transmission period a) at least one information packet is transmitted from any one of said end user devices to said communications network during said first sub-period, and b) said stand-alone data symbol is transmitted from any one of the end-user devices to said communications network during said second sub-period.

26. The system of claim 22 wherein said scheduler divides said second transmission period into at least a first, a second and a third sub-periods such that during said second transmission period said scheduler transmits to at least one of the end user devices a) a message acknowledging reception of said request to transmit originated from one of said end-user devices during said first sub-period, b) said transmission permission granted to one of the end-user devices during said second sub-period and c) said data during said third sub-period.

27. The system of claim 25 wherein said first sub-period defines at least one first uplink logical channel for transmission of said stand-alone data symbol when said one or more information packets newly arrive at said empty buffer of said at least one of said end-user devices, and wherein said second sub-period defines at least one second uplink logical channel for transmission of said at least one information packet.

28. The system of claim 22 wherein said scheduler divides said first transmission period into a plurality of sub-periods that define a plurality of logical uplink channels for transmission of a plurality of said stand-alone data symbols when said one or more information packets newly arrive at empty buffers of said end-user devices.

29. The system of claim 22 wherein said scheduler divides said first transmission period into a plurality of sub-periods that define a plurality of logical uplink channels for transmission of said at least one information packet by more than one of said end-user devices.

30. The system of claim 22 wherein said scheduler divides said second transmission period into a plurality of sub-periods so as a) to form during at least a first one of said sub-periods at least one first downlink logical channel for the transmission of a message acknowledging reception of said request to transmit originated from one of said end-user devices, b) to form during at least a second of said sub-periods at least one second uplink logical channel for transmission of said transmission permission granted to one of the end-user devices and c) to form during at least a third one of said sub-periods at least one third downlink logical channel for transmission of said data.

31. The system of claim 22 wherein during said second transmission period said scheduler transmits only messages acknowledging reception of said request to transmit signals originated from more than one of said end-user devices.

32. The system of claim 22 wherein said communications network is a shared physical communications path that connects said end-user devices to said scheduler.

33. The system of claim 32 wherein communications from said end-user devices to said scheduler take place at a first frequency associated with said communications path while communications from said scheduler to said end-user devices take place at a second frequency associated with said communications path.

34. An apparatus for granting access to a shared communications network of a data transmission system, said apparatus comprising:
a scheduler that allocates during a transmission period a communications path bandwidth to a selected one of a plurality of end-user devices, selection of said one of a plurality of end-user devices being based on factors which include access priority codes associated with each one of said end-user devices contending for access to said communications path;

a controller that is included in said scheduler that receives from at least one of said end-user devices requests for access to said communications path, said requests being in the form of at least one of a) a stand-alone data symbol that is transmitted by said at least one of said end-user devices when one or more information packets arrive at empty buffers of said at least one of said end-user devices, and b) a piggybacked data symbol that is included in one or more information packets being transmitted by at least one of said end-user devices, said piggybacked data symbol being indicative of additional data streams buffered in said at least one of said end-user devices and waiting to be transmitted via said communications path.

35. The apparatus of claim 34 wherein said scheduler allocates said bandwidth of said communications path based on a technique selected from a group of techniques which includes time-division multiplexing and frequency-division multiplexing.

36. A method for an end-user device to request access to a communications network, said method comprising:

receiving from a scheduler of said communications network a signal indicative of permission for said end-user device to transmit to said communications network one or more information packets; and including a data symbol in said one or more information packets before transmitting said one or more information packets, said data symbol being included in said one or more information packets to indicate to said scheduler that said end-user device needs to transmit one or more additional information packets.

37. The method of claim 36 wherein said scheduler grants said permission to transmit in response to receiving a request to transmit signal from aid end-user device.

38. The method of claim 36 wherein said communications network is connected to a plurality of end-user devices and wherein said scheduler grants permission to one of said end-user devices that are requesting access to said communication network based on individual access priority codes associated with each one of said end-user devices requesting said access.

39. The method of claim 36 wherein said end-user device includes said data symbol in said one or more information packets when said one or more additional information packets are expected to be received at said end-user device before said scheduler grants to said end-user device permission to transmit said one or more additional information packets.

40. A system to grant access to resources of a communications network, said system comprising:

a scheduler that grants permission to a selected one of a plurality of end-user devices to transmit one or more information packets to said communications network; and a processor of said selected one of said end-user devices that includes a data symbol in said one or more information packets before transmitting said one or more information packets, said data symbol being included in said one or more information packets to indicate to said scheduler that said end-user device needs to transmit one or more additional information packets.

41. The system of claim 40 wherein said scheduler grants said permission to transmit to said selected one of said end-user devices in response to receiving a request to transmit signal from said selected one of said end-user devices.

42. The system of claim 40 wherein said scheduler grants said permission to a selected one of said end-user devices that are requesting access to said communications network based on access priority code associated with each one of said end-user devices requesting said access.

43. The system of claim 40 wherein selected one of said end-user devices includes said data symbol in said one or more information packets when said one or more additional information packets are expected to be received at said selected one of said end-user devices before said scheduler grants to said selected one of said end-user devices permission to transmit said additional one or more information packets.

* * * * *